(12) United States Patent
Morimoto (10) Patent No.: US 9,494,214 B2
(45) Date of Patent: Nov. 15, 2016

(54) METAL CHAIN

(71) Applicant: TSUBAKIMOTO CHAIN CO., Osaka-shi, Osaka (JP)

(72) Inventor: Takayuki Morimoto, Osaka (JP)

(73) Assignee: TSUBAKIMOTO CHAIN CO., Osaka (JP)

(*) Notice: Subject to any disclaimer, the term of this patent is extended or adjusted under 35 U.S.C. 154(b) by 77 days.

(21) Appl. No.: 14/522,969

(22) Filed: Oct. 24, 2014

(65) Prior Publication Data
US 2015/0148164 A1   May 28, 2015

(30) Foreign Application Priority Data

Nov. 28, 2013   (JP) .................................. 2013-246111

(51) Int. Cl.
*F16G 13/02* (2006.01)
*F16G 13/06* (2006.01)

(52) U.S. Cl.
CPC ..................................... *F16G 13/06* (2013.01)

(58) Field of Classification Search
CPC ........ F16G 13/06; F16G 13/02; F16G 13/18; B21L 15/005; B21L 9/00
USPC ....................................................... 474/206
See application file for complete search history.

(56) References Cited

U.S. PATENT DOCUMENTS

| | | | | |
|---|---|---|---|---|
| 697,190 A | * | 4/1902 | Aultman | ................. F16G 13/06 305/204 |
| 1,469,001 A | * | 9/1923 | Gentry | ................. B62D 55/205 305/202 |
| 2,517,497 A | * | 8/1950 | Lauenstein | ............... B21L 9/00 264/155 |
| 3,359,815 A | * | 12/1967 | Mueller | ................ B21L 15/005 474/231 |
| 3,921,792 A | * | 11/1975 | Anderson | .............. A01D 17/10 198/851 |
| 4,636,181 A | * | 1/1987 | Savolainen | ............ B65G 17/38 198/850 |
| 4,642,078 A | * | 2/1987 | Dupoyet | ................. F16G 13/06 474/206 |

(Continued)

FOREIGN PATENT DOCUMENTS

| | | |
|---|---|---|
| CN | 101749369 A | 6/2010 |
| DE | 10330998 B4 | 6/2007 |

(Continued)

*Primary Examiner* — Henry Liu
(74) *Attorney, Agent, or Firm* — Westerman, Hattori, Daniels & Adrian, LLP (57) ABSTRACT

To provide a metal chain having reduced weight and size but uncompromized strength, and manufacturable/assemblable with reduced work burden and cost. A metal chain is formed by coupling together a plurality of inner links and outer links alternately and pivotably in a longitudinal direction of the chain. Each of the outer link includes a pair of front and back pins and a pair of left and right outer plates. Each of the inner links includes a pair of front and back bushings and a pair of left and right inner plates. The pair of front and back bushings and the pair of left and right inner plates of the inner link are integrally formed as one component.

6 Claims, 10 Drawing Sheets

(56) References Cited

U.S. PATENT DOCUMENTS

| | | | | |
|---|---|---|---|---|
| 4,704,098 A * | 11/1987 | Tsubakimoto | .......... | F16G 13/02 474/206 |
| 5,073,153 A * | 12/1991 | Wu | .......... | F16G 13/06 474/206 |
| 5,098,349 A * | 3/1992 | Wu | .......... | F16G 13/06 474/206 |
| 5,151,066 A * | 9/1992 | Wu | .......... | F16G 13/06 474/206 |
| 5,178,585 A * | 1/1993 | Lin | .......... | F16G 13/06 474/206 |
| 5,203,745 A * | 4/1993 | Wang | .......... | F16G 13/06 474/206 |
| 5,267,909 A * | 12/1993 | Iacchetta | .......... | F16G 13/04 474/206 |
| 5,288,278 A * | 2/1994 | Nagano | .......... | B62M 9/00 474/228 |
| 5,322,482 A * | 6/1994 | Wang | .......... | F16G 13/06 474/206 |
| 5,322,483 A * | 6/1994 | Wang | .......... | F16G 13/06 474/206 |
| 5,439,421 A * | 8/1995 | Tanaka | .......... | F16G 13/06 474/206 |
| 5,709,075 A * | 1/1998 | Wu | .......... | F16G 13/06 474/206 |
| 5,741,196 A * | 4/1998 | Campagnolo | .......... | F16G 13/06 474/206 |
| 5,799,479 A * | 9/1998 | Tanaka | .......... | F16G 13/06 474/206 |
| 5,810,688 A * | 9/1998 | Hama | .......... | H02G 11/006 474/206 |
| 5,943,855 A * | 8/1999 | Morimoto | .......... | B21L 9/08 474/206 |
| 5,950,416 A * | 9/1999 | Kerner | .......... | F16G 13/06 474/206 |
| 6,662,544 B1 * | 12/2003 | Wu | .......... | F16G 13/06 474/206 |
| 6,855,080 B2 * | 2/2005 | Kanehira | .......... | F16G 13/06 384/564 |
| 7,201,687 B2 * | 4/2007 | Mott | .......... | F16G 13/04 156/215 |
| 7,896,766 B2 * | 3/2011 | Mitzschke | .......... | B65G 17/086 198/850 |
| 8,734,280 B2 * | 5/2014 | Oishi | .......... | F16G 13/06 474/230 |
| 2002/0173392 A1 * | 11/2002 | Doi | .......... | F16C 33/6696 474/209 |
| 2005/0288141 A1 * | 12/2005 | Tohara | .......... | F16G 13/06 474/206 |
| 2007/0082776 A1 * | 4/2007 | Nagao | .......... | F16G 13/06 474/230 |
| 2008/0026896 A1 * | 1/2008 | Curran | .......... | F16G 13/06 474/206 |
| 2010/0137088 A1 | 6/2010 | Ohsawa et al. | | |
| 2013/0190121 A1 * | 7/2013 | Skipper | .......... | F16G 13/06 474/206 |
| 2014/0057750 A1 * | 2/2014 | Yokoyama | .......... | F16G 13/06 474/206 |
| 2014/0141913 A1 * | 5/2014 | Yokoyama | .......... | F16G 13/18 474/206 |
| 2014/0171246 A1 * | 6/2014 | Ritz | .......... | F16G 13/06 474/206 |

FOREIGN PATENT DOCUMENTS

| | | |
|---|---|---|
| JP | 45-28809 Y | 11/1970 |
| JP | 55-59809 A | 5/1980 |
| JP | 02-32916 Y2 | 9/1990 |
| JP | 2007-107583 A | 4/2007 |
| JP | 3152356 U | 7/2009 |

* cited by examiner

METAL CHAIN

BACKGROUND OF THE INVENTION

1. Field of the Invention

The present invention relates to a metal chain formed by coupling together a plurality of inner links and outer links alternately and pivotably in the longitudinal direction of the chain.

2. Description of the Related Art

Figure 16:
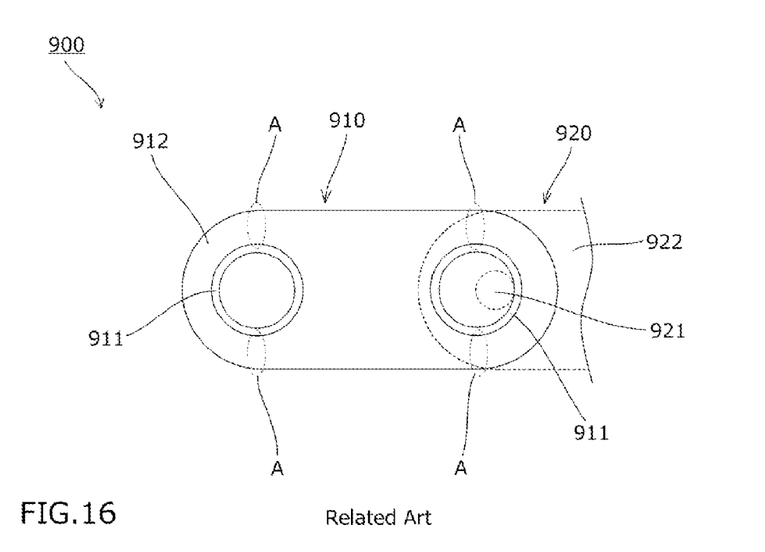
FIG. 16 is a diagram for explaining a conventional chain.

FIG. 16 shows a conventionally known metal chain formed by coupling together a plurality of inner links and outer links alternately and pivotably in the longitudinal direction of the chain. The chain 900 is formed by coupling together outer links 920 and inner links 910 alternately, each outer link 920 having a pair of outer plates 922 with pins 921 fixed in pin holes of the outer plates 922, and each inner link 910 having a pair of inner plates 912 with bushings 911 fixed in bushing holes of the inner plates 912, with the pins 921 of the outer links 920 loosely fitted in the bushings 911 of the inner links 910 (see, for example, Japanese Patent Application Laid-open No. 2007-107583).

SUMMARY OF THE INVENTION

Press-fitting, whereby the bushings 911 are press-fitted into the bushing holes of the inner plates 912, is a commonly used technique to join the inner plates 912 with the bushings 911 for the metal chain such as the chain 900 of Japanese Patent Application Laid-open No. 2007-107583.

However, press-fitting the bushings 911 to the inner plate 912 lowers the strength of the inner plate 912, as it causes portions A of the inner plate 912 shown in FIG. 16 to easily rupture because tensile force generated by the chain tension tends to concentrate on these portions. Increasing the rigidity of the inner plate 912 to make up for the reduced strength thereof would lead to an increase in size or weight of the inner plate 912, which is a problem characteristic to metal chains.

In order to press-fit bushings 911 to the inner plate 912, the inner plate 912 needs a portion of at least a certain width around the bushing holes, which is also a problem characteristic to metal chains, and this results in an increase in the size in the chain height direction, and weight, of the inner plate 912 corresponding to the increased plate portions.

Another problem with the conventional chain 900 is that the outer plates 922, pins 921, inner plates 912, and bushings 911 need to be separately subjected to forming, thermal treatment, and finishing processes, so that the burden and cost of manufacturing the chain are high.

Furthermore, the conventional chain 900 is assembled through a large number of process steps such as press-fitting pairs of front and back bushings 911 to pairs of left and right inner plates 912 to form inner links 910, inserting pairs of front and back pins 921 that are press-fitted to the outer plates 922 into the bushings 911, and connecting the outer plates 922 with the pairs of front and back pins 921 by press-fitting, and so on, so that work burden in assembling the chain is high.

The present invention solves these problems and it is an object of the invention to provide a metal chain having reduced weight and size but uncompromised strength, and manufacturable/assemblable with reduced work burden and cost.

The present invention solves the problems described above by providing a metal chain formed by coupling together a plurality of inner links and outer links alternately and pivotably in a longitudinal direction of the chain. Each of the outer links includes a pair of front and back pins, and a pair of left and right outer plates that connect the pair of front and back pins. Each of the inner links includes a pair of front and back bushings that axially support the pins, and a pair of left and right inner plates that connect the pair of front and back bushings. The pair of front and back bushings and the pair of left and right inner plates of the inner link are integrally formed as one component.

According to the invention as set forth in claim 1, the pair of front and back bushings and the pair of left and right inner plates of the inner link are integrally formed as one component, so that hardly any rupture occurs in the inner plates that may result from press-fitting. Thus the inner link can have enhanced strength without increasing weight or size.

While the conventional inner plate needed a portion of more than a certain width around the bushing hole if the bushing is to be press-fitted to the inner plate, the inner plate does not need such a portion according to the invention as set forth in claim 1. Thus the inner plate can be reduced in its chain height direction and weight.

Since the inner link is formed as one component, the number of components is reduced, so that the work burden and cost in the manufacture or assembling of the chain are reduced.

According to the invention as set forth in claim 2, an outer edge of the bushing and an outer edge of the inner plate in a chain width direction overlap with each other in some regions. The inner link is thus reduced in weight, and has less irregularities in its contour, so that the inner link can be manufactured more easily.

According to the invention as set forth in claim 3, an outer edge of the bushing overlaps an outer edge of the inner plate in a chain width direction at least in a pair of front and back outer regions. Therefore, in addition to the reduction in the weight and burden in the manufacture of the inner link, the inner link can also be reduced in size in the chain height direction.

According to the invention as set forth in claim 4, the inner link further includes a reinforcement portion that extends from one of the pair of front and back bushings to the other one of the pair of front and back bushings on a side that does not mesh with a sprocket. The inner link can thus have enhanced strength without the possibility of inhibiting the meshing with the sprocket.

According to the invention as set forth in claim 5, the outer link is formed by two components, which are a first outer link part and a second outer link part that are each formed integrally, so that the number of components is further reduced, and the work burden and cost in the manufacture or assembling of the chain are reduced. Moreover, since the outer link has fewer portions where the pins are press-fitted to the outer plates, the outer link can have higher strength.

According to the invention as set forth in claim 6, the first outer link part and the second outer link part are formed in the same shape. As there are less types of components forming the chain, the work burden and cost in the manufacture or assembling of the chain are reduced.

DESCRIPTION OF THE PREFERRED EMBODIMENTS

Examples

A metal chain 100 according to a first embodiment of the present invention will be hereinafter described with reference to the drawings.

Figure 1:
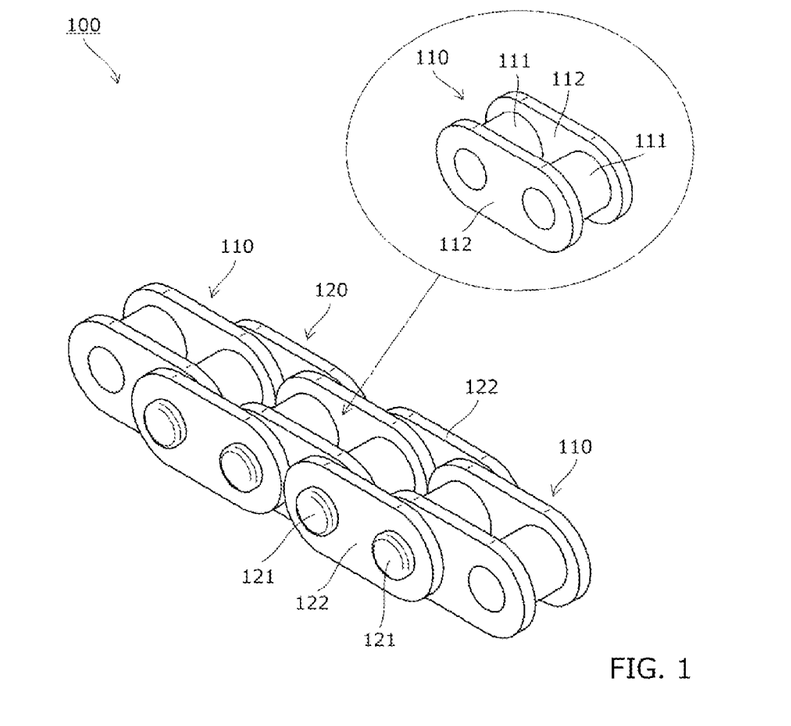
FIG. 1 is a diagram for explaining a metal chain according to a first embodiment.
Figure 2:
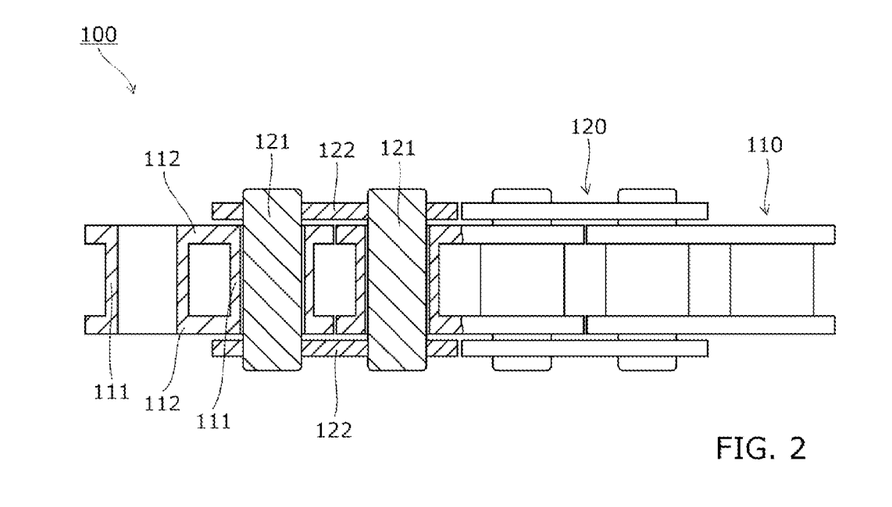
FIG. 2 is a cross-sectional plan view showing a part of the metal chain according to the first embodiment.

The metal chain 100 of the first embodiment is configured as a timing chain incorporated in a timing system of a car engine, and includes a plurality of inner metal links 110 and a plurality of outer metal links 120, as shown in FIG. 1 or FIG. 2. These inner links 110 and outer links 120 are alternately connected to each other along the longitudinal direction of the chain by inserting pins 121 of the outer links 120 into bushings 111 of the inner links 110.

Each inner link 110 includes a pair of front and back bushings 111 for axially supporting pins 121, and a pair of left and right inner plates 112 that connect the pair of front and back bushings 111 in the longitudinal direction of the chain. The inner link 110 is integrally formed, each as an independent component, by plastic working such as forging or pressing, or casting, or metal injection molding, or machining. The bushing 111 has a bushing hole, and the inner plate 112 has a plate hole of the same diameter as that of the bushing hole. The bushing 111 and the inner plate 112 are connected to each other such that their holes are concentric.

Each outer link 120 includes a pair of front and back pins 121 and a pair of left and right outer plates 122 that connect the pair of front and back pins 121 in the longitudinal direction of the chain, these being formed as separate components. The pins 121 are fixed both ends thereof in pin holes of the outer plates 122 at by press-fitting or the like.

Figure 3:
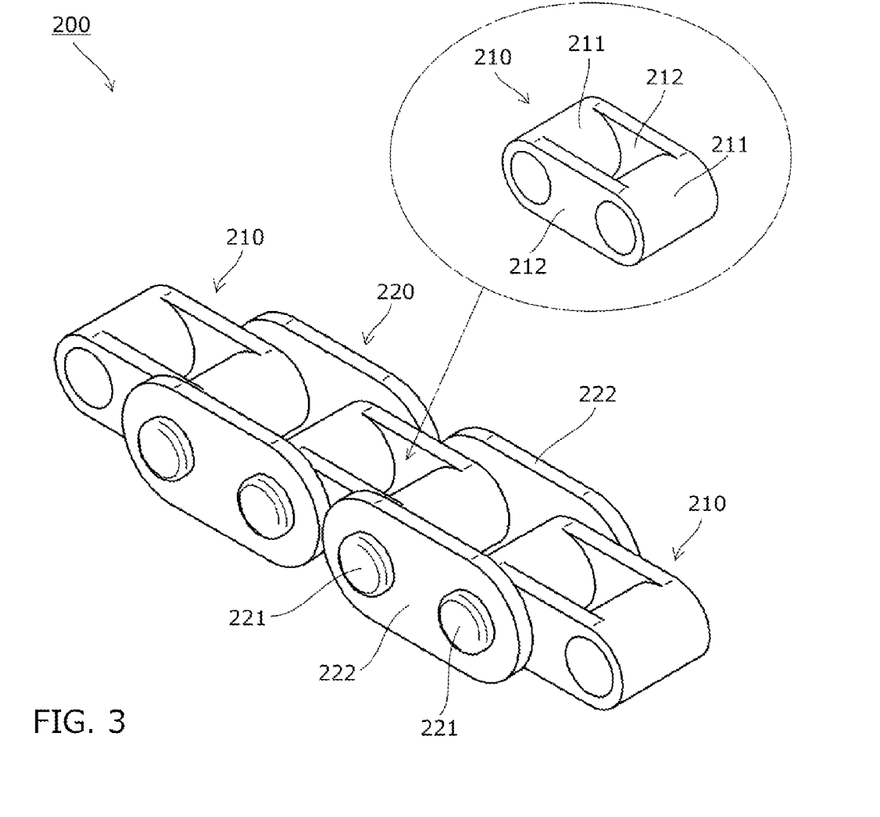
FIG. 3 is a diagram for explaining a metal chain according to a second embodiment.
Figure 4:
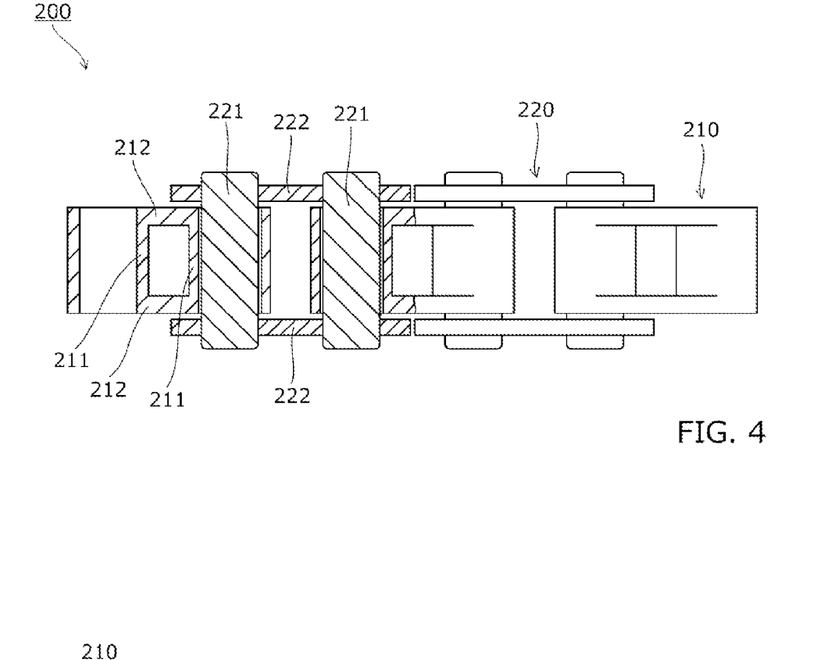
FIG. 4 is a cross-sectional plan view showing a part of the metal chain according to the second embodiment.

Next, a metal chain 200 according to a second embodiment of the present invention will be described with reference to FIG. 3 to FIG. 5. The second embodiment is basically the same as the previously described first embodiment except for some parts. Therefore, elements of the second embodiment that are identical to those of the first embodiment denoted by numerals beginning with "1" herein and in the drawings will be numbered the same but beginning with "2" instead of "1", and will not be described again.

First, the metal chain 200 of the second embodiment is different from that of the first embodiment in the size of the inner plate 212 of the inner link 210. Namely, in the metal chain 200 of the second embodiment, as shown in FIG. 5, when the inner link 210 is divided into three regions—a pair of front and rear outer regions Ro and an inner region Ri—by imaginary lines L passing through centers C of the bushing holes 211a of the bushings 211 (plate holes 212a of the inner plates 212) and extending along a chain height direction, outer edges of the bushings 211 overlaps with, in a chain width direction, outer edges of the inner plates 212 in the pair of front and rear outer regions Ro.

In this embodiment, as described above, the outer edges of the bushings 211 overlap with the outer edges of the inner plates 212 entirely in the outer regions Ro, but they may overlap with each other only partly in the outer regions Ro, or also in part of the inner region Ri.

Figure 5:
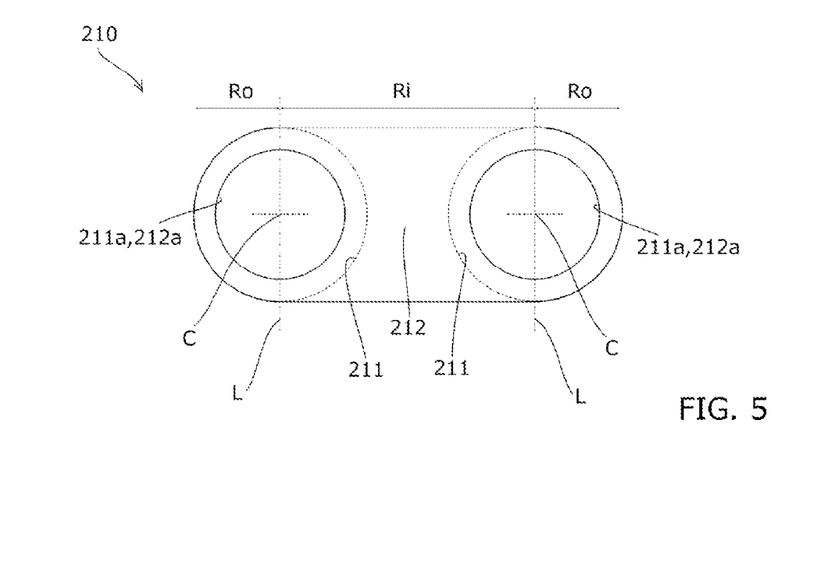
FIG. 5 is a diagram for explaining an inner link according to the second embodiment.

The outer edges of the inner plates 212 are straight in the inner region Ri as shown in FIG. 5 in this embodiment, but they may be curved outward or inward in the inner region Ri.

Next, a metal chain 300 according to a third embodiment of the present invention will be described with reference to FIG. 6 to FIG. 10. The third embodiment is basically the same as the previously described second embodiment except for some parts. Therefore, elements of the third embodiment that are identical to those of the second embodiment denoted by numerals beginning with "2" herein and in the drawings will be numbered the same but beginning with "3" instead of "2", and explanation thereof will be omitted except for constitutions exhibiting differences from those in the second embodiment.

Figure 6:
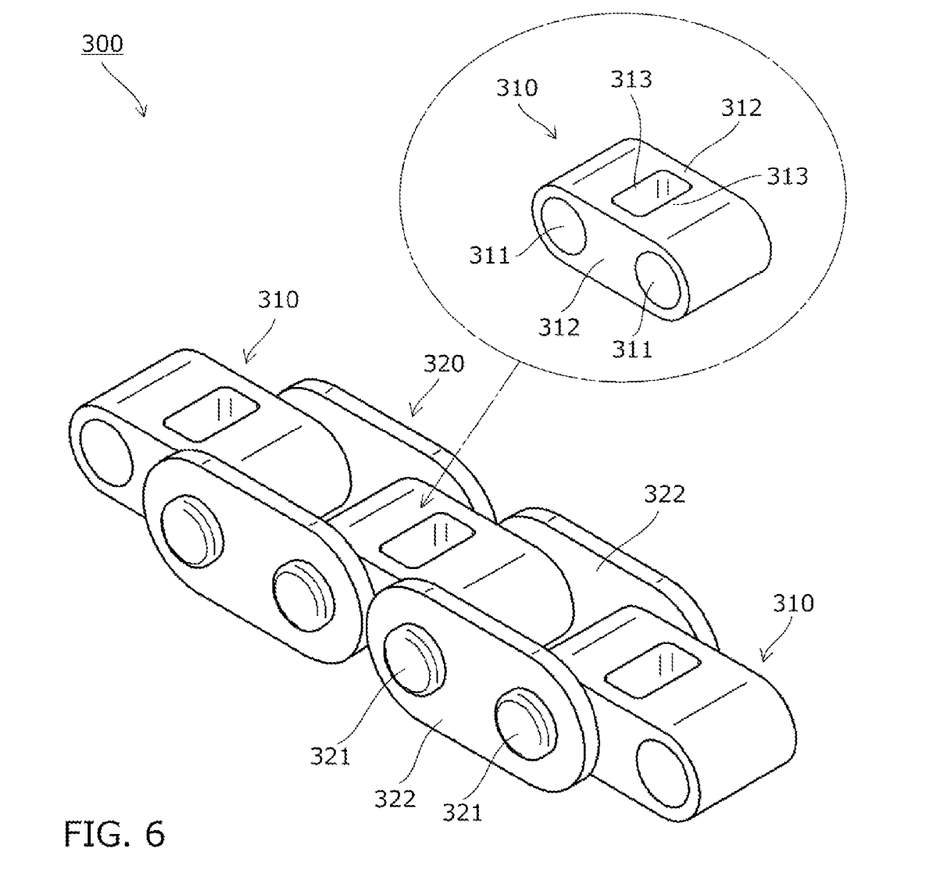
FIG. 6 is a diagram for explaining a metal chain according to a third embodiment.
Figure 7:
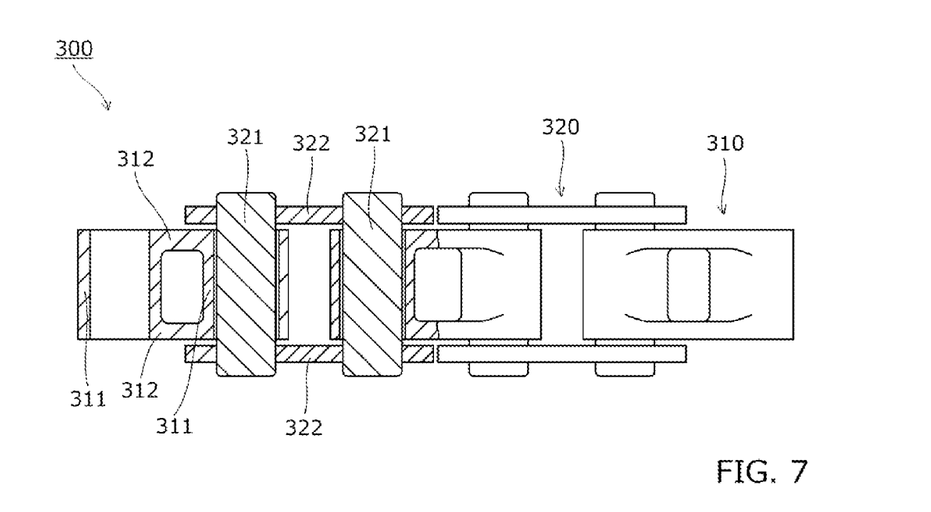
FIG. 7 is a partially cross-sectional plan view of the metal chain according to the third embodiment.
Figure 8:
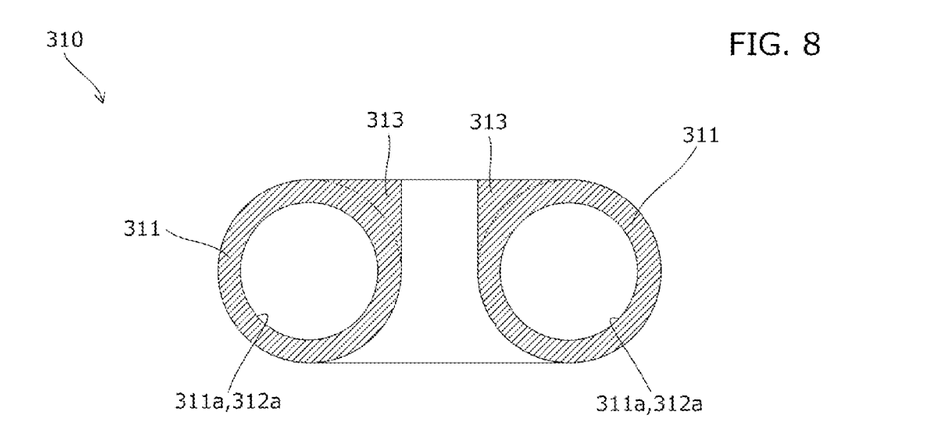
FIG. 8 is a cross-sectional view of an inner link according to the third embodiment.

In the metal chain 300 of the third embodiment, as shown in FIG. 6 or FIG. 8, the inner link 310 includes a total of two reinforcement portions 313 each extending from one bushing 311 toward the other bushing 311 on the side that does not mesh with a sprocket (not shown), more specifically on a radially outer side of a pitch circle P of the sprocket (not shown).

Figure 9:
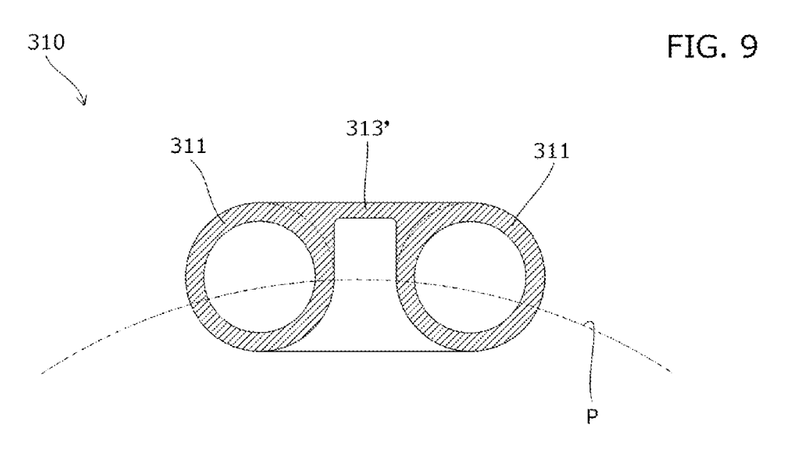
FIG. 9 is a diagram for explaining an inner link according to a variation example of the third embodiment.

As the reinforcement portions 313 are formed on a radially outer side of the pitch circle P of the sprocket (not shown), the reinforcement portions 313 do not inhibit meshing with the sprocket (not shown), so the reinforcement portions 313 may be formed in any shapes. For example, a reinforcement portion 313' may be formed such as to connect one bushing 311 with the other bushing 311 as shown in FIG. 9.

The metal chain 300 of the third embodiment thus formed not only has inner links 310 with higher strength enhanced by the reinforcement portions 313, but also, since the inner link 310 has a different shape on the side that meshes with the sprocket from the side that does not mesh with the sprocket due to formation of the reinforcement portions 313, the inner link 310 offers clear indication of its orientation when assembling the chain, with the reinforcement portions 313 serving as a distinguishing mark. This, in turn, allows easy establishment of positional accuracy between the bushing hole 311a and plate hole 312a of the inner link 310, and an outer circumferential portion of the bushing 311 on the side that meshes with the sprocket.

Figure 10:
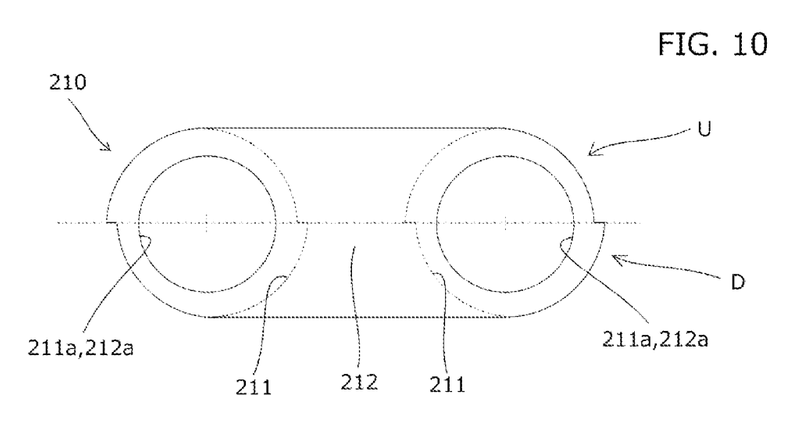
FIG. 10 is a diagram for explaining an example of a failure in the forming of the inner link.

Namely, with reference to FIG. 10 that shows an example of a failure in the forming of the inner link 210 according to the second embodiment, when the inner link 210 is molded with the use of an upper mold, a lower mold, and a core for forming a hole (bushing hole 211a and plate hole 212a), sometimes the inner link 210 may be formed to have an upper side U and a lower side D displaced from each other in the chain height direction because of a misalignment between the upper mold and lower mold during the molding of the inner link 210. If the upper side U and the lower side D in the chain height direction of the inner link 210 are symmetrical as in the second embodiment, it is not clear which of the upper side U or the lower side D in the chain height direction of the inner link 210 is the side that is to mesh with the sprocket. Therefore, there is a possibility that the displaced side (upper side U or lower side D in the chain height direction of the inner link 210) where the bushing hole 211a and the plate hole 212a are misaligned may be mistaken as the side that is to mesh with the sprocket. In this regard, with the metal chain 300 of the third embodiment, the side that is to mesh with the sprocket can be distinguished easily by the reinforcement portions 313 of the inner link 310 as a mark. Therefore, by molding the inner link with a precise positional relationship between the outer circumferential portion of the bushing 311 on the side that meshes with the sprocket and the bushing hole 311a/plate hole 312a, positional accuracy between the bushing hole 311a/plate hole 312a and the outer circumferential portion of the bushing 311 on the side that meshes with the sprocket can readily be established.

Next, a metal chain 400 according to a fourth embodiment of the present invention will be described with reference to FIG. 11 and FIG. 12. The fourth embodiment is basically the same as the previously described second embodiment except for some parts. Therefore, elements of the fourth embodiment that are identical to those of the second embodiment denoted by numerals beginning with "2" herein and in the drawings will be numbered the same but beginning with "4" instead of "2", and explanation thereof will be omitted expect for constitutions exhibiting differences from those of the second embodiment.

Figure 11:
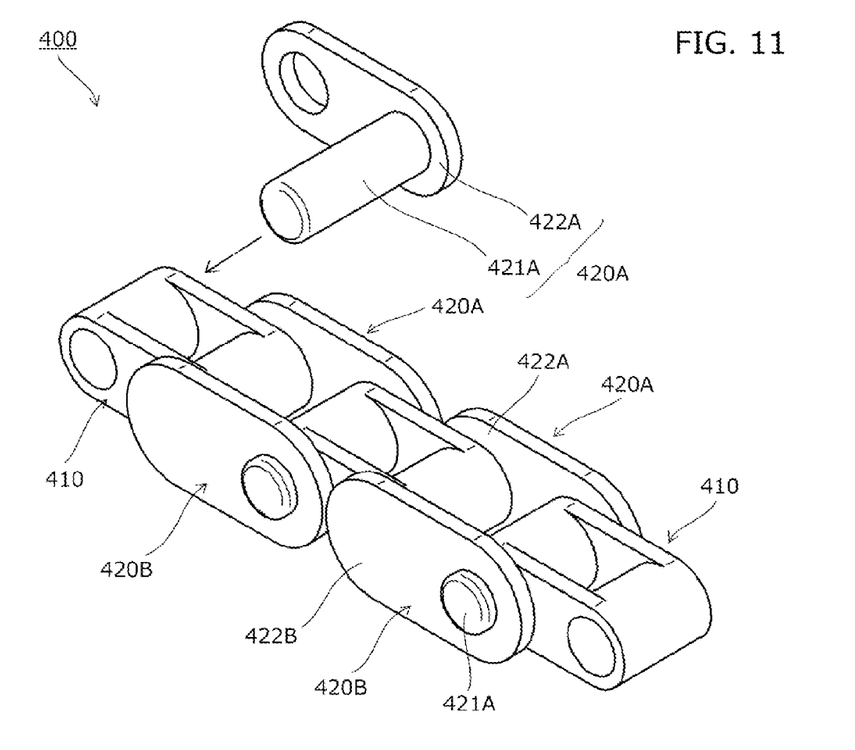
FIG. 11 is a diagram for explaining a metal chain according to a fourth embodiment.
Figure 12:
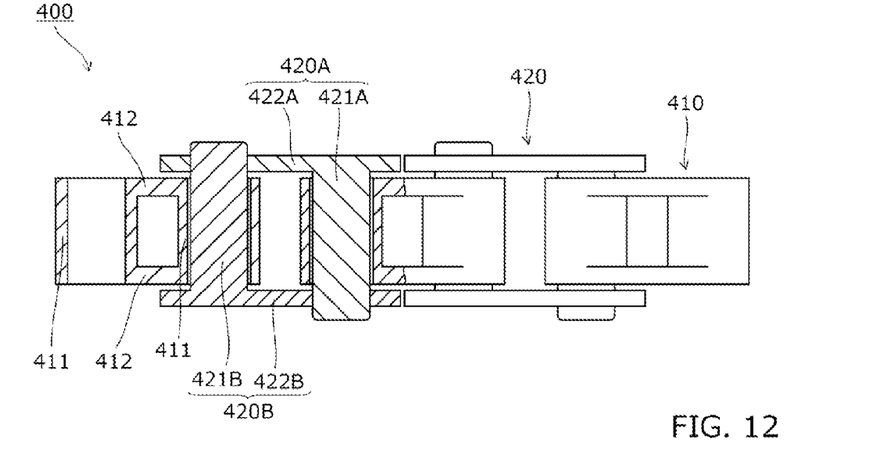
FIG. 12 is a partially cross-sectional plan view of the metal chain according to the fourth embodiment.

In the metal chain 400 of the fourth embodiment, as shown in FIG. 11 or FIG. 12, the outer link 420 is formed by two components, a first outer link part 420A and a second outer link part 420B, each integrally formed by plastic working such as forging or pressing, or casting, or metal injection molding, or machining.

The outer link parts 420A and 420B each have one outer plate 422A or 422B and one pin 421A or 421B, and formed in an identical shape.

Figure 13:
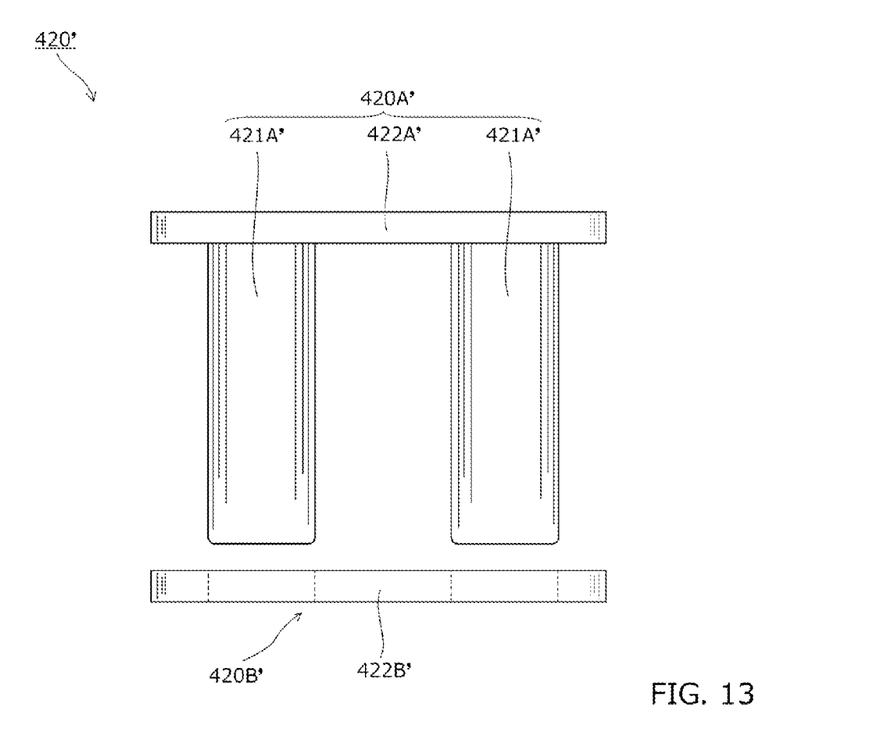
FIG. 13 is a diagram for explaining an outer link according to a variation example of the fourth embodiment.

The outer link parts 420A and 420B are not limited to the specific form described above. For example, as shown in FIG. 13, an outer link 420' may be configured to have a first outer link part 420A' having one outer plate 422A' and two pins 421A', and the second outer link part 420B' having one outer plate 422B'.

Figure 14:
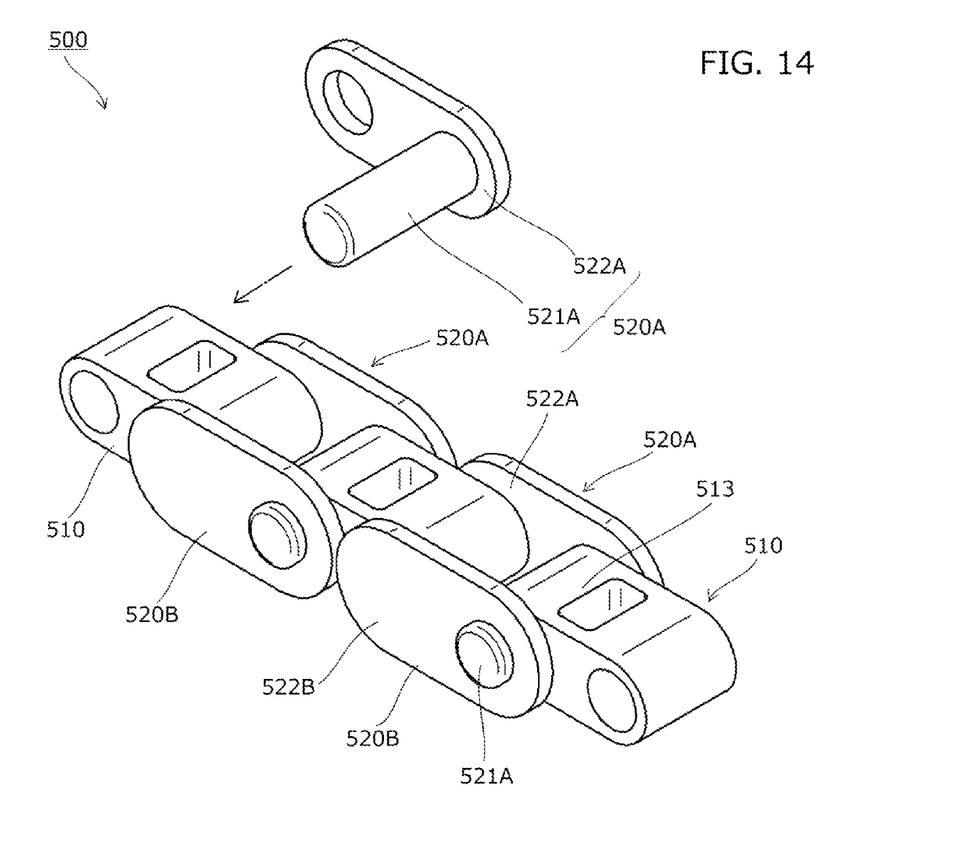
FIG. 14 is a diagram for explaining a metal chain according to a fifth embodiment.
Figure 15:
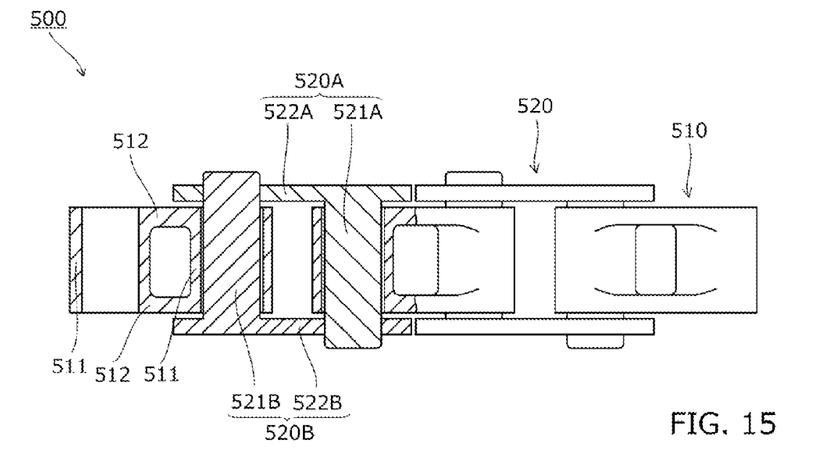
FIG. 15 is a partially cross-sectional plan view of the metal chain according to the fifth embodiment.

As one alternative, as shown in FIG. 14 and FIG. 15, a metal chain 500 may be formed by combining outer links 520 configured similarly to that of the fourth embodiment and inner links 510 configured similarly to that of the third embodiment.

While the metal chain was described as a timing chain of a car engine in the embodiments above, the purpose of use of the metal chain of the present invention is not limited to this application, and may be used as a transmission chain or a conveyor chain.

While the chains in the embodiments above have one inner link in the chain width direction, they may have a plurality of inner links arranged in the chain width direction.

Various embodiments and variation examples shown above may be freely combined to form other metal chains.

Various parts of the metal chain may be made of any of ferrous metals such as iron, steel and the like, or non-ferrous metals such as aluminum, copper, and the like.

What is claimed is:

1. A metal chain formed by coupling together a plurality of inner links and outer links alternately and pivotably in a longitudinal direction of the chain, wherein
   each of said outer links includes a pair of front and back pins, and a pair of left and right outer plates that connect said pair of front and back pins,
   each of said inner links includes a pair of front and back bushings that axially support said pins, and a pair of left and right inner plates that connect said pair of front and back bushings, and
   said pair of front and back bushings and said pair of left and right inner plates of said inner link are integrally formed as one component,
   said inner link further includes a reinforcement portion that extends from one of said pair of front and back bushings towards the other one of said pair of front and back bushings on a side that does not mesh with a sprocket and on the inner side between said left and right inner plates, and
   said inner link has a different shape on the side that meshes with the sprocket from the side that does not mesh with the sprocket.

2. The metal chain according to claim 1, wherein said bushing has an outer edge that overlaps with an outer edge of said inner plate in some regions in a width direction of the chain.

3. The metal chain according to claim 2, wherein
   when said inner link is divided into three regions, which are pair of front and back outer regions and an inner region, by imaginary lines passing through centers of said bushings and extending in a chain height direction, said outer edge of the bushing overlaps with said outer edge of the inner plate at least in a pair of front and back outer regions of said inner link.

4. The metal chain according to claim 1, wherein said reinforcement portion extends from said one of said pair of front and back bushings to the other one of said pair of front and back bushings.

5. The metal chain according to claim 1, wherein said outer link is formed by two components, which are a first outer link part and a second outer link part, each being integrally formed.

6. The metal chain according to claim 5, wherein said first outer link part and said second outer link part each have the one outer plate and the one pin, and formed in the same shape.

* * * * *